(12) United States Patent
Mui et al.

(10) Patent No.: US 6,299,329 B1
(45) Date of Patent: Oct. 9, 2001

(54) ILLUMINATION SOURCE FOR A SCANNER HAVING A PLURALITY OF SOLID STATE LAMPS AND A RELATED METHOD

(75) Inventors: Paul K. Mui; Craig L. Miller, both of Boise; Eric L. Andersen, Meridian, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/256,618

(22) Filed: Feb. 23, 1999

(51) Int. Cl.⁷ ..................................... F21S 33/00
(52) U.S. Cl. .................... 362/227; 362/231; 362/800
(58) Field of Search .................... 362/227, 800, 362/231, 230

(56) References Cited

U.S. PATENT DOCUMENTS

| | | | |
|---|---|---|---|
| 4,899,214 | 2/1990 | Robbins et al. | 358/515 |
| 4,942,621 | 7/1990 | Angwin | 382/313 |
| 5,612,811 * | 3/1997 | Aikawa et al. | 359/204 |
| 5,639,158 * | 6/1997 | Sato | 362/247 |
| 5,744,795 | 4/1998 | Bianchi et al. | 250/234 |
| 5,750,974 * | 5/1998 | Sasaki et al. | 235/454 |
| 5,753,906 | 5/1998 | Gennetten | 250/226 |
| 5,767,979 | 6/1998 | Kim | 358/296 |
| 5,808,295 * | 9/1998 | Takeda et al. | 250/216 |
| 5,810,463 * | 9/1998 | Kawahara et al. | 362/31 |
| 5,825,984 | 10/1998 | Mori et al. | 358/1.5 |
| 5,836,676 * | 9/1998 | Ando et al. | 362/244 |
| 5,929,999 | 7/1999 | Butterworth | 356/405 |
| 5,997,150 * | 12/1999 | Anderson | 362/227 |
| 6,139,174 * | 10/2000 | Butterworth | 362/555 |

FOREIGN PATENT DOCUMENTS

| | | |
|---|---|---|
| 0171925A | 7/1985 | (EP) . |
| 63115285A | 5/1988 | (JP) . |
| 08331325A | 12/1996 | (JP) . |
| 09018655A | 1/1997 | (JP) . |
| 09050510A | 2/1997 | (JP) . |
| 09102849A | 4/1997 | (JP) . |
| 10308536A | 11/1998 | (JP) . |
| 10308860A | 11/1998 | (JP) . |
| 10334176A | 12/1998 | (JP) . |

OTHER PUBLICATIONS

CIS Technology/CIS Advantages; ScanVision Inc.; 1998; Web Design by COPTECH WEST.
HP Introduces White LEDs with Color–Temperature Grading; Hewlett–Packard Web Page; Mar. 23, 1999; pp. 1–3.

* cited by examiner

Primary Examiner—Thomas M. Sember
Assistant Examiner—Ronald E. DelGizzi
(74) Attorney, Agent, or Firm—Gregg W. Wisdom

(57) ABSTRACT

A first embodiment of an illumination source including red LEDs, green LEDs, and blue LEDs provides illumination for a scanner. The LEDs are arranged in an array to generate spectrally and spatially substantially uniform illumination on the surface of an object, such as printed media, which is to be scanned. The arrangement of LEDs includes a plurality of groups of three LEDs. Each group of LEDs includes a red LED, a green LED, and a blue LED. The LEDs of like colors are connected in series. Power is supplied to the three groups of series connected LEDs by three current sources. The three current sources are each configured to supply a constant current to one of the groups of series connected LEDs. Each current source supplies a magnitude of current so that the resulting light provides substantially uniform illumination on the printed media. A second embodiment of the illumination source includes LEDs that can each generate light having a substantially uniform energy spectrum over the range of visible light frequencies. A third embodiment of the illumination source includes a plurality of groups of four LEDs. Each of the groups of LEDs includes a red LED, a green LED, a blue LED, and a yellow LED.

17 Claims, 5 Drawing Sheets

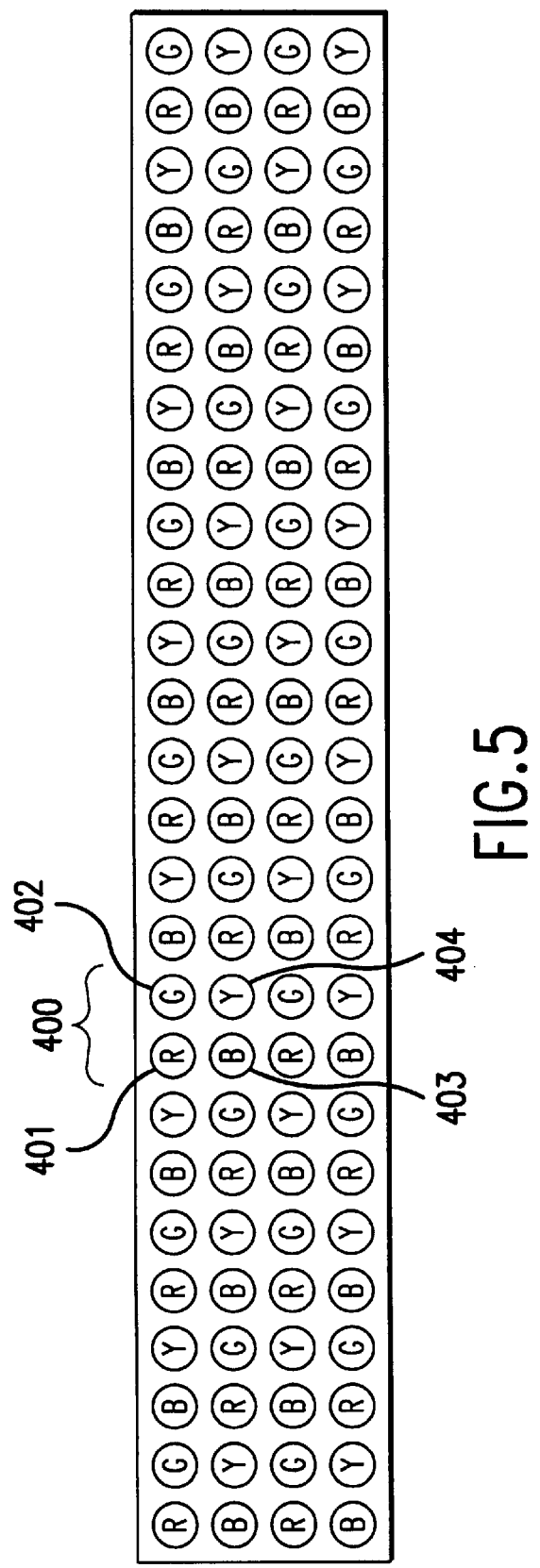

ILLUMINATION SOURCE FOR A SCANNER HAVING A PLURALITY OF SOLID STATE LAMPS AND A RELATED METHOD

FIELD OF THE INVENTION

This invention relates to illumination sources. More particularly, this invention relates to the use of solid state lamps in an illumination source.

BACKGROUND OF THE INVENTION

Fluorescent lamps have been used to provide illumination for scanners. As an illumination source, fluorescent lamps provide the advantage of low operating temperatures. However, fluorescent lamps have several disadvantages. Typically, the visible light spectrum generated by a fluorescent lamp includes spikes (locations in the spectrum of emitted light for which the energy is above the desired nominal level) and holes (locations in the spectrum of emitted light for which the energy is below the desired nominal level). Furthermore, the spectral content of the light generated by fluorescent lamps shifts over time. In addition, the illumination intensity tends to vary over time. As a result, the scanner must frequently undergo calibration cycles to compensate for shifts in the spectral content of the lamp and the lamp intensity. Fluorescent lamps are generally the scanner component having the highest failure rate. As a result, replacement of the fluorescent lamp during the operating life of the scanner may be required.

Because the illumination characteristics of fluorescent lamps are temperature dependent, a warm up time in the range of one minute is generally required before use on both cold cathode fluorescent lights and hot cathode fluorescent lights. In some scanner applications, the time required from the initiation of scanning the first unit of media to completion is an important performance parameter. In order to reduce the time required for scanning the first unit of media, several techniques have been employed. In one technique, the fluorescent lamp is driven at higher than normal operating power in order to accelerate the warming of the lamp. In another technique, the lamp is continuously illuminated in order to eliminate the delay associated with the warming of the lamp. However, both of these techniques reduce the life of the fluorescent lamp, thereby worsening fluorescent lamp reliability problems. A need exists for an illumination source that improves upon these performance and reliability limitations.

SUMMARY OF THE INVENTION

Accordingly, an illumination source for use in a scanner to illuminate an object for scanning includes a plurality of solid state lamps. The plurality of the solid state lamps is configured to generate light having a substantially uniform energy spectrum over a range of visible light frequencies for illuminating the object when power is supplied to the plurality of the solid state lamps.

A scanner for scanning images formed on an object to be scanned, includes a scanning mechanism including a sensor for measuring light reflected from the object to be scanned. The scanner further includes an illumination source for illuminating the object to be scanned. The illumination source includes a plurality of the solid state lamps configured to generate the light having a substantially uniform energy spectrum over a range of visible light frequencies. The light is generated when power is supplied to the plurality of the solid state lamps.

In an illumination source, including a plurality of solid state lamps, used in a scanner configured to scan an object, a method for using the illumination source includes applying power to each of the plurality of the solid state lamps to generate light. The method further includes guiding the light to illuminate the surface of the object with the light having a substantially uniform energy spectrum over a range of visible light frequencies.

DESCRIPTION OF THE DRAWINGS

A more thorough understanding of the invention may be had from the consideration of the following detailed description taken in conjunction with the accompanying drawings in which:

FIG. 5 shows a third embodiment of the illumination source.

DETAILED DESCRIPTION OF THE DRAWINGS

The present invention is not limited to the specific exemplary embodiments illustrated herein. Although an embodiment of the illumination source will be disclosed in the context of a scanner using a CCD sensor, it should be recognized that the illumination source may be useful as an illumination source for scanners using other types of sensors, such as a charge image sensor. Furthermore, although the embodiment of the illumination source will be disclosed in the context of a scanner using a stationary sensor, it should be recognized that the illumination source also has applicability for a scanner using a movable sensor.

Figure 1:
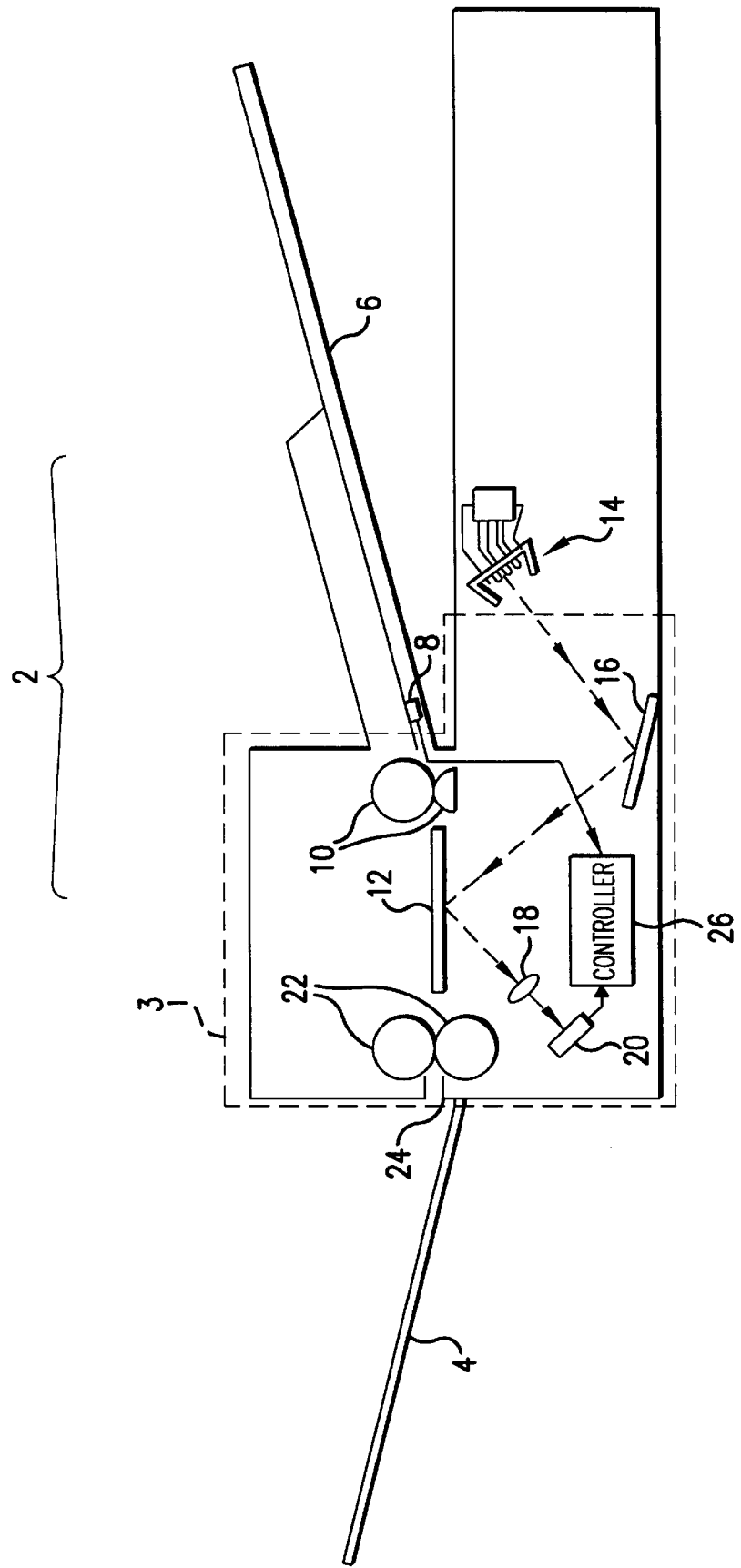
FIG. 1 shows a simplified cross section of a scanner including an embodiment of the illumination source.

Shown in FIG. 1 is a simplified schematic view of a scanner including an embodiment of the illumination source. The object to be scanned follows a straight-through path in scanner 2. Output device 4 could include an output tray. The object to be scanned, such as a unit of printed media, is placed in input device 6. Input device 6 could include an automatic document feeder for automatically loading units of printed media. Sensor 8 detects the presence of the printed media loaded in input device 6. In response to the detection of printed media, pick-up-rollers 10 pull the printed media onto the transparent surface 12 included in the scanning mechanism. Included in scanner 2 is a scanning mechanism 3 that includes some of the various assemblies necessary for producing an electronic representation of the image on the surface of the printed media. An embodiment of the illumination source 14 is used for illuminating the printed media. A mirror 16 is used to direct light emanating from illumination source 14 onto the surface of the printed media as it moves over transparent surface 1 2. A lens 1 8 focuses the light reflected from the surface of the printed media onto optical sensor 20. Optical sensor 20 senses the image formed from the light reflected off the surface of the printed media in order to generate electrical signals representing the image on the surface of the printed media. Optical sensor 20 could include charge coupled devices (CCDs) or charge image sensors arranged in a linear array. However; with charge image sensors it may be necessary to locate the sensor closer to the object to be scanned because of its lower sensitivity.

As the leading edge of the printed media continues past transparent surface 1 2, the leading edge of the printed media passes between output rollers 22. Output rollers 22 push the object to be scanned through slot 24 and into output device 4.

The light reflected from the surface of the printed media contains the information about the image on the surface of the printed media. The image formed on the surface of optical sensor 20 corresponds to a relatively narrow slice (with the long axis of the slice running perpendicular to the direction of movement of the object through the scanning mechanism) across the entire width of the printed media. The focusing action of lens 1 8 effectively forms a scaled image of a slice of the printed media so that optical sensor 20 can be less than the width of the printed media. Because illumination source 14 generates light having a substantially uniform energy spectrum over the visible light spectrum (alternatively referred to as "white light " in this specification) the light reflected from the surface of the printed media includes information about the colors of the image on the printed media. To detect this color information, optical sensor 20 includes three separate sections corresponding to the red, green, and blue frequency ranges. Each of the sections includes a filter for removing light outside the frequency band corresponding to that section. For example, the CCD section for measuring the red component of the reflected light includes a red filter.

An important performance characteristic for illumination source 14 is that it provides light having a substantially uniform energy spectrum over the visible light spectrum to the surface of the printed media. The term "substantially ", as it refers to the uniformity of the spectrum of light emitted from illumination source 14, means that the spectrum of the light impinging upon the surface of the printed media to be scanned is sufficiently uniform to permit the scanner 2 to form a digital representation of the spectral components of the image on the surface of the printed media having an accuracy that at least meets the scanner specifications.

There are scanners having straight-through paths for which a duplex scan can be performed in a single pass of the printed media through the scanning mechanism. These types of scanners typically employ pairs of light sources, mirrors, lenses, and optical sensors located above and below the path the printed media follows through the scanner. As the printed media passes through the scanner, the images on both sides of the printed media are collected by the optical sensors located on either side. Illumination source 14 is also useful for scanners configured for performing duplex scanning.

A first embodiment of illumination source 14 that could be used in scanner 2 includes arrays of red, green, and blue solid state lamps, such as LEDs. White light can be generated by combining the light from light sources that supply red, green, and blue light. The relatively recent development of blue LEDs having sufficiently high luminance made the formation of a white light source from red, green, and blue LEDs practical. The different color LED's are arranged across the width of illumination source 14 so that light having a substantially uniform energy spectrum over the visible light spectrum is produced on the surface of the printed media which is to be scanned. It should be recognized that there are a variety of LED arrangements which can achieve this performance characteristic. For the embodiment of the illumination source 14 included in scanner 2, a substantially uniform energy spectrum is achieved by closely locating a multiplicity of groups of small LED elements, with each group including a LED of each color, across the width of the illumination source.

Solid state lamps have been developed which are able to produce light having the spectral characteristics of white light from a single solid state lamp. A second embodiment of illumination source 14 that could be used in scanner 2 includes an array formed from this type of solid state lamp, such as white light LEDs.

Optical sensor 20 is periodically sampled as the printed media moves beneath it. The variations in the intensity of the light reflected from the surface of the printed media are converted into electrical signals by optical sensor 20. For the case in which a linear array of CCD elements forms optical sensor 20, each of the CCD elements in the linear array provides a measurement of the intensity of the reflected light from the positionally corresponding location across the printed media. Controller 26 digitizes the measurements received from each of the elements in optical sensor 20 at each sampling interval. The digital data forms a representation of the image on the surface of the printed media. The digital data could be sent to a printer for printing the data as received from scanner 2 or the digital data could be sent to a printer for printing after additional image processing options are performed. Alternatively, the data could be sent to a host computer for storage for future use.

Figure 2:
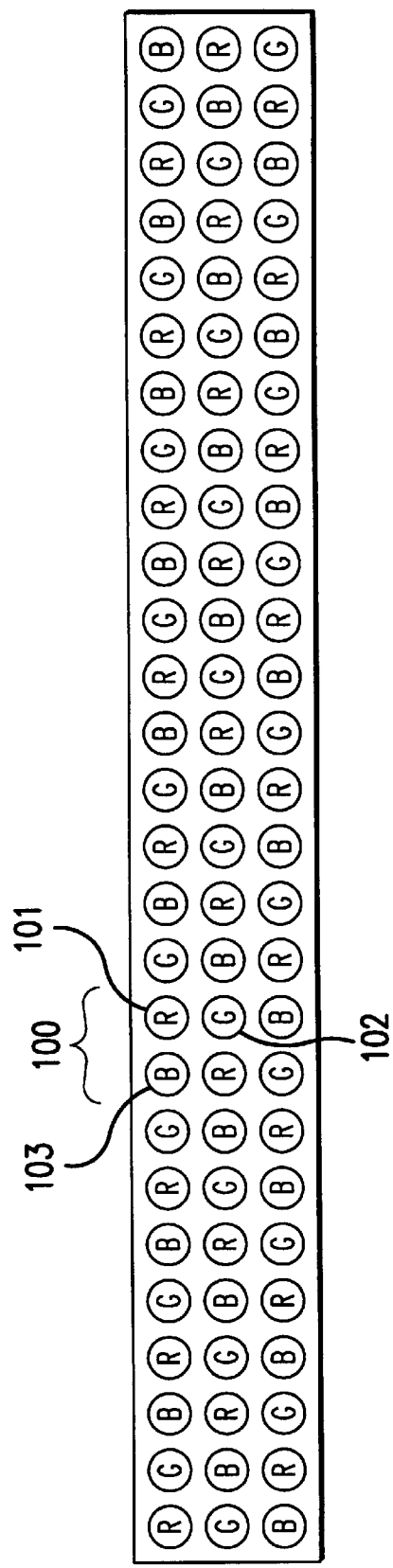
FIG. 2 shows a first embodiment of the illumination source.

Shown in FIG. 2 is part of a first embodiment of the illumination source 14. For ease of illustration, the side shield of the embodiment of the illumination source 14 shown in FIG. 2 is not included. Included in illumination source 14 are a plurality of groups each formed of three solid state lamps, such as LEDs. An exemplary group 100 of LEDs includes a red LED 101, a green LED 102, and a blue LED 103. The combination of the visible light frequencies provided by each of the LEDs produces light having a substantially uniform energy spectrum over the visible spectrum. It should be recognized that although the embodiment of the illumination source 14 in FIG. 2 uses red, green and blue LEDs, other combinations of colored LEDs may be used to generate a substantially uniform energy spectrum. Furthermore, although the embodiment of the illumination source 14 in FIG. 2 uses a particular arrangement of the groups of three LEDs to achieve a substantially uniform energy spectrum, other arrangements may be used to achieve a similar result. For example, instead of arranging the LEDs into groups each containing one of the three colors, the LEDs could be arranged in rows of alternating colors. An important aspect of the arrangement is that the distance between the different color LEDs is small relative to the distance between the surface which is to be illuminated and the groups of LEDs.

In addition to achieving a substantially uniform energy spectrum, it is important to achieve an illumination intensity that is substantially uniform spatially. The LEDs act as point sources. An important factor that can affect the spatial uniformity of the illumination is the spacing between the LEDs relative to the distance to the surface of the object to be scanned. Other ways in which spatial uniformity can be achieved include using diffusing devices or arrangements that include tubes with reflective surfaces.

Figure 3:
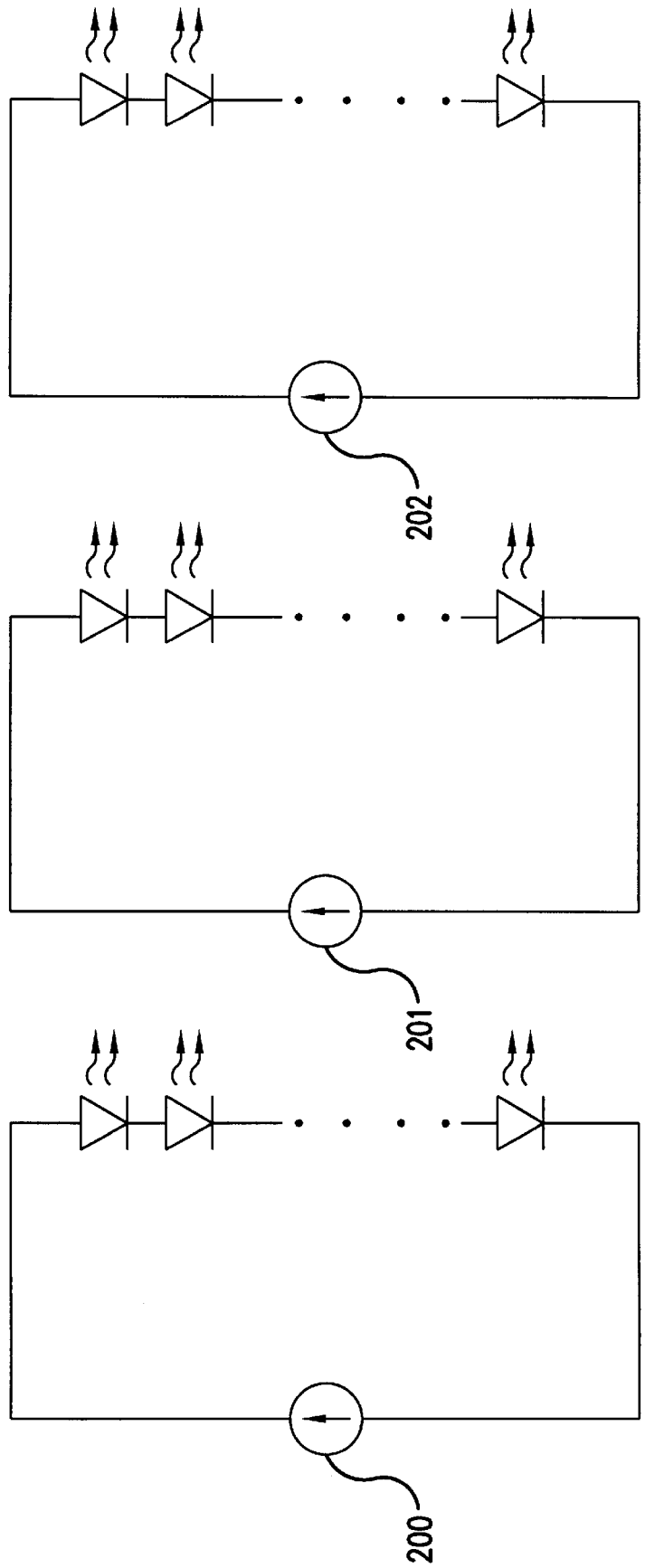
FIG. 3 shows a simplified schematic of a circuit to supply current to the LEDs in the illumination source.

Shown in FIG. 3 is an embodiment of a drive circuit for the illumination source 14. The red LEDs, green LEDs, and blue LEDs are physically positioned into a multiplicity of groups in which each group includes one of the three colors. However, the LEDs are electrically connected so that LEDs having the same color are connected in series with the current source. Series connection of LEDs having the same color ensures that same color LEDs will be driven with the same magnitude of current. To accomplish this, the drive circuit includes three separate current sources to supply current to the red LEDs, the green LEDs and the blue LEDs. The magnitude of the current supplied to each of the groups of like colored LEDs is selected so that the light power emitted by the LEDs in the illumination source 14 will provide light to the surface of the printed media having a substantially uniform energy spectrum in the visible range.

Although the drive circuit shown in FIG. 3 supplies current to three sets of series connected LEDs, it should be recognized that a drive circuit could also be used that supplied current to more than three groups of series connected LEDs. Limitations on the power supply used to power the drive circuit may require this configuration. For example, the LEDs of each color could be divided into two groups of approximately equal number. All of the LEDs in each group would be connected in series. Each of the series connected groups would then be supplied with the necessary current from a current source.

The luminous efficiency (luminous power emitted per watt of emitted radiant power) of the LED is dependent upon the color of the LED. Generally, blue and green LEDs have lower luminous efficiency than red LEDs. Because of the differences in luminous efficiency between different colored LEDs, the drive currents supplied by the first current source 200, second current source 201, and third current source 202 would be selected so that the LEDs of each color supply the luminous intensity necessary to generate the desired visible energy spectrum. It should be recognized that other types of supply circuits and electrical configurations of the LEDs could be used to generate the desired visible energy spectrum. For example, a voltage source could be used to supply current to parallel connected groups of like colored LEDs connected in series within each of the groups. Current limiting resistors could be connected in series with each of the groups in order to set the current at the level necessary for the particular color of LED in the group to generate the desired visible energy spectrum.

There are other factors that could be adjusted in illumination source 14 to generate white light. For example, the relative physical location of the LEDs will have an effect on the uniformity of the light spectrum at the surface of the object to be scanned. In addition to using red, green, and blue LEDs in illumination source 14 to generate white light, other colors of LEDs could be used to generate white light. For example, yellow LEDs could be used in addition to red, green, and blue LEDs to generate white light. Yellow LEDs would add part of the visible light spectrum provided by red LEDs and green LEDs. The use of additional colors of LEDs to generate white light adds another factor that can be adjusted to generate white light from the illumination source. Relative position, relative power output, and LED light frequency can be adjusted in order to create an illumination source having optimal performance (in terms of spatial and spectral uniformity) at a given level of cost.

Figure 4:
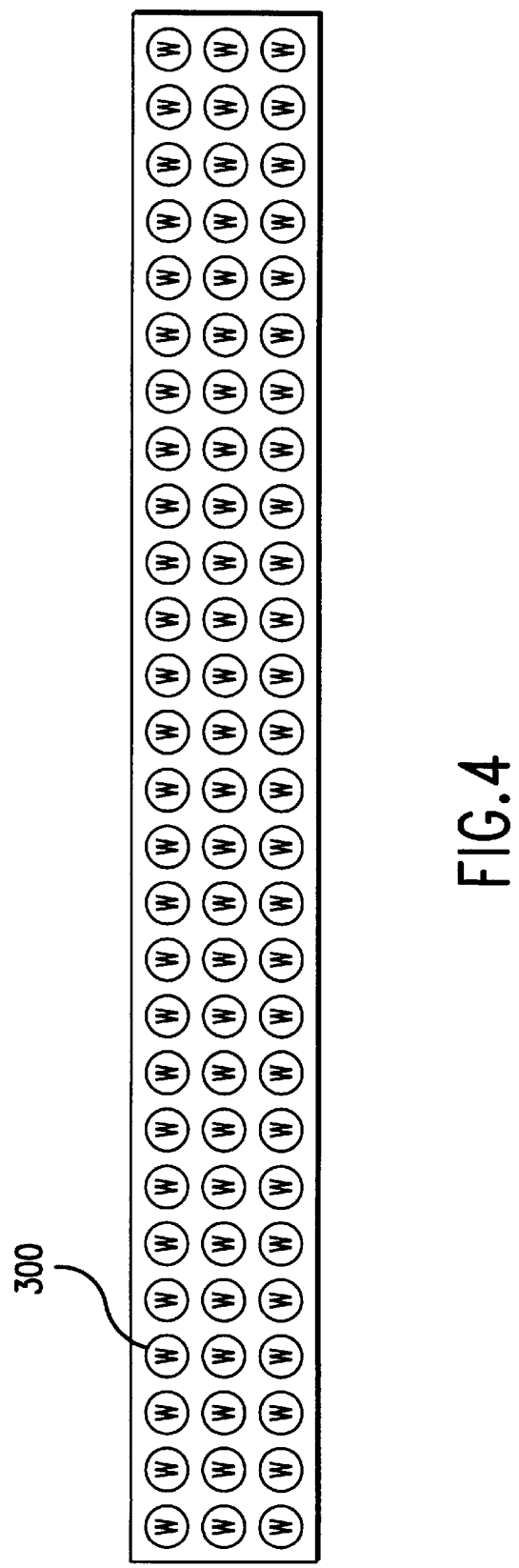
FIG. 4 shows a second embodiment of the illumination source.

Shown in FIG. 4 is a part of a second embodiment of illumination source 14. The second embodiment of illumination source 14 includes solid state lamps, such as LEDs, which generate white light, such as LED 300. Because each of the LEDs shown in FIG. 4 generates light having a substantially uniform energy spectrum over the visible light range, there is not the consideration of relative positioning of LEDs having different colors as was the case for the first embodiment of illumination source 14. Similar to the configuration shown in FIG. 3, the white light LEDs could be electrically connected in series and supplied with by a single current source.

Shown in FIG. 5 is a part of a third embodiment of illumination source 14. The third embodiment of the illumination source 14 includes a plurality of groups of four solid state lamps, such as LEDs. Each group includes a red LED, a green LED, a blue LED, and a yellow LED. An exemplary group 400 of LEDs includes a red LED 401, a green LED 402, a blue LED 403, and a yellow LED 404. The yellow LED contributes part of the light energy in the visible spectrum supplied by the red LED and the green LED in the first embodiment of illumination source 14. The addition of a yellow LED provides an additional factor that can be adjusted to generate white light on the surface of the object to be scanned. A drive circuit similar to that shown in FIG. 3 could be used to supply power to each of the four groups of LEDs. The drive circuit of FIG. 3 would need to include an additional current source to provide current to the series connected yellow LEDs.

Either of the first, second, or third embodiments of illumination source 14 could be implemented using fewer LEDs with the appropriate modification to scanner 2. The modification to scanner 2 would include replacing mirror 1 6 with a light pipe. The light pipe would be used to convey the light from illumination source 14 to the surface of the object to be scanned. The light pipe could be shaped to have a rectangular cross section with the long dimension of the rectangular cross section corresponding to the width of the object to be scanned. In the embodiment of the scanner shown in FIG. 2, a substantial portion of the light emitted by illumination source 14 is not reflected from the surface of mirror 1 6 onto the object to be scanned. As a result, illumination source 14 must be designed to provide sufficient light energy to compensate for this loss. However, if a light pipe is used to convey the light from illumination source 1 4 to the surface of the object to be scanned, the fraction of the light emitted from illumination source 14 that is lost is substantially reduced. The higher level of efficiency can be obtained because the light pipe can be configured to couple a very high percentage of the light emitted by illumination source 14 into the light pipe. Additionally, because of the internal reflection inside of the light pipe, very little of this light is lost from the sides of the light pipe. With the substantially lower loss of light energy achieved using the light pipe, the intensity of the light emitted from illumination source 14 can be correspondingly less. This permits the use of fewer LEDs.

Although several embodiments of the invention have been illustrated, and their forms described, it is readily apparent to those of ordinary skill in the art that various modifications may be made to these embodiments without departing from the spirit of the invention or from the scope of the appended claims.

What is claimed is:

1. An illumination source for use in a scanner to illuminate an object for scanning, comprising:
    a plurality of white light solid state lamps to each generate light having a substantially uniform spectrum over a range of visible light frequencies for illuminating the object with power contemporaneously supplied to the plurality of the white light solid state lamps.

2. An illumination source for use in a scanner to illuminate an object for scanning, comprising:
    a plurality of solid state lamps to generate light of a plurality of colors and configured to form composite light having a substantially uniform spectrum over a range of visible light frequencies for illuminating the object with power contemporaneously supplied to the plurality of the solid state lamps.

3. The illumination source as recited in claim 2, wherein:
    each of the solid state lamps includes a LED.

4. The illumination source as recited in claim 3, wherein:

the plurality of the LEDs includes a plurality of groups of the LEDs with each of the groups including a first LED for providing a first color, a second LED for providing a second color, and a third LED for providing a third color.

5. The illumination source as recited in claim 4, wherein:

the first LED includes a configuration to emit red light the second LED includes a configuration to emit green light; and the third LED includes a configuration to emit blue light.

6. The illumination source as recited in claim 5 wherein:

each of the groups includes a fourth LED to emit yellow light, where the first LED, the second LED, the third LED, and the fourth LED include a configuration to generate the light having the substantially uniform spectrum over the range of visible light frequencies with the power contemporaneously supplied to the first LED, the second LED, the third LED, and the fourth LED.

7. A scanner for scanning images formed on an object to be scanned, comprising:

a scanning mechanism including a sensor for measuring light reflected from the object to be scanned; and an illumination source for illuminating the object to be scanned including a plurality of solid state lamps to generate the light of a plurality of colors and configured to form composite light having a substantially uniform spectrum over a range of visible light frequencies with power contemporaneously supplied to the plurality of the solid state lamps.

8. The scanner as recited in claim 7 wherein:

each of the solid state lamps includes a LED.

9. The scanner as recited in claims 8, wherein:

the plurality of the LEDs includes a plurality of groups of LEDs with each of the groups including a first LED for providing a first color, a second LED for providing a second color, and a third LED for providing a third color.

10. The scanner as recited in claim 9, wherein:

the first LED includes a configuration to emit red light the second LED includes a configuration to emit green light; and the third LED includes a configuration to emit blue light.

11. The scanner as recited in claim 10, wherein:

each of the groups includes a fourth LED to emit yellow light, where the first LED, the second LED, the third LED, and the fourth LED include a configuration to generate the light having the substantially uniform spectrum over the range of visible light frequencies with the power contemporaneously supplied to the first LED, the second LED, the third LED, and the fourth LED.

12. A method for using an illumination source, including a plurality of solid state lamps, in a scanner configured to scan an object, comprising:

applying power contemporaneously to each of the solid state lamps to generate light from the solid state lamps of a plurality of colors;

combining the light of the plurality of colors to form composite light having a substantially uniform spectrum over a range of visible light frequencies; and guiding the composite light to illuminate the surface of the object.

13. The method as recited in claim 12, wherein:

the plurality of the solid state lamps includes a plurality of groups of solid state lamps with each of the groups including a first solid state lamp for providing a first color, a second solid state lamp for providing a second color, and a third solid state lamp for providing a third color.

14. The method as recited in claim 13, wherein:

the first solid state lamp, the second solid state lamp, and the third solid state lamp each include a LED.

15. The method as recited in claim 14, wherein:

the first LED includes a configuration to emit red light the second LED includes a configuration to emit green light; and the third LED includes a configuration to emit blue light.

16. The method as recited in claim 15 wherein:

each of the groups includes a fourth LED to emit yellow light where the first LED, the second LED, the third LED, and the fourth LED include a configuration to generate the light having the substantially uniform spectrum over the range of visible light frequencies with the power contemporaneously supplied to the first LED, the second LED, the third LED, and the fourth LED.

17. A scanner for scanning images formed on an object to be scanned, comprising:

a scanning mechanism including a sensor for measuring light reflected from the object to be scanned; and an illumination source for illuminating the object to be scanned including a plurality of white light solid state lamps to each generate the light having a substantially uniform spectrum over a range of visible light frequencies with power supplied to the plurality of the white light solid state lamps.

* * * * *